United States Patent Office 2,781,958
Patented Feb. 19, 1957

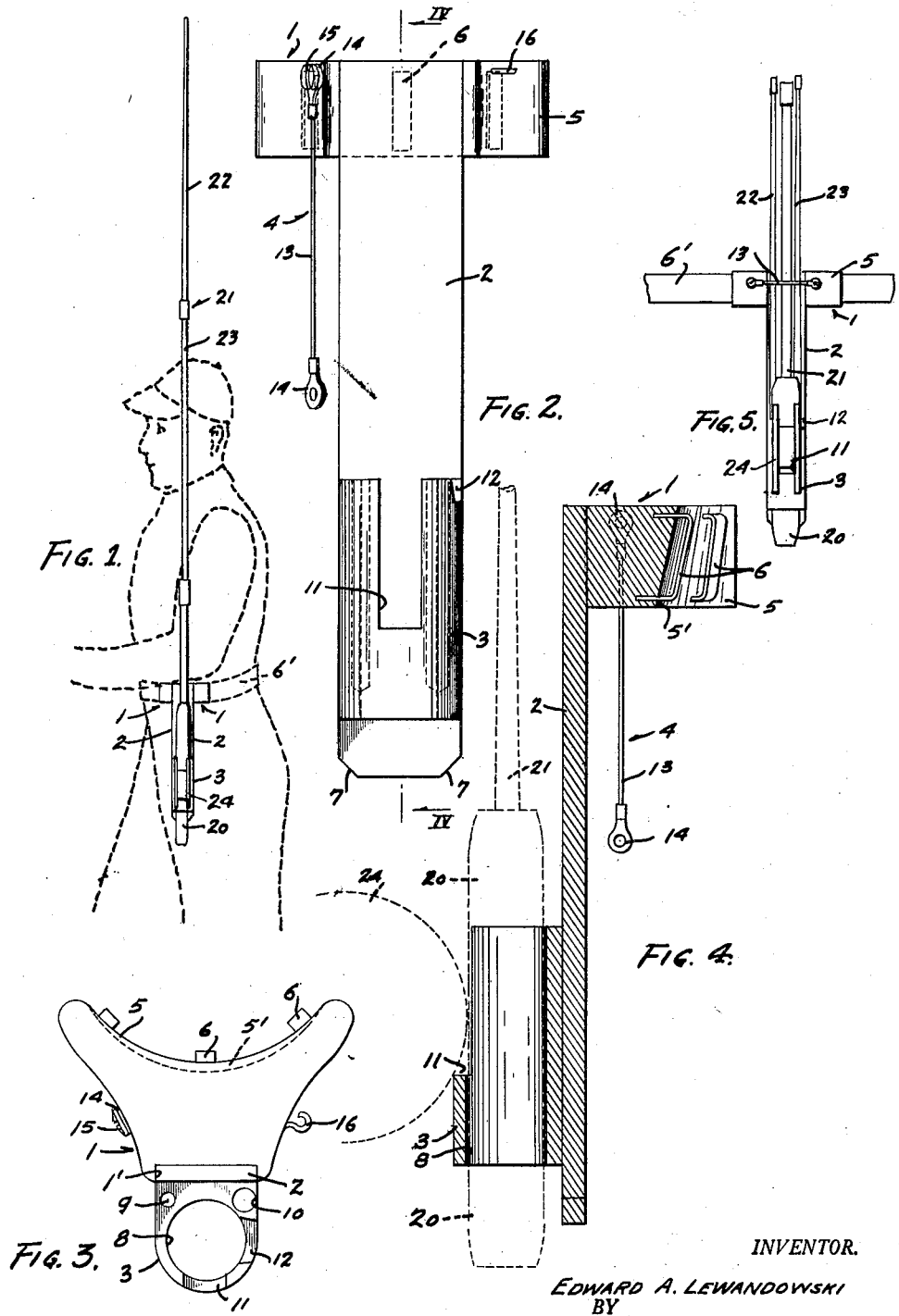

2,781,958
FISHING ROD HOLDER

Edward A. Lewandowski, Buffalo, N. Y.

Application August 18, 1954, Serial No. 450,671

3 Claims. (Cl. 224—5)

This invention relates to a new and useful fishing rod holder device, and more specifically to a portable fishing rod holder adapted to be worn by the user and serving to support the fishing rod, in either assembled or disassembled condition, in a manner allowing the fisherman the free use of both hands, even while actually fishing.

Many holder devices have heretofore been proposed to assist a fisherman in holding and supporting a fishing rod. However, such prior art devices frequently comprise a relatively cumbersome harness which is strapped to the body, or they require the use of at least one hand and therefore leave only one hand free. In addition, such devices generally are not suited for the purpose of carrying the fishing rod while moving about from place to place.

Quite often it is desired to have both hands free while actually fishing, as when baiting the hook or changing lures, as well as when removing fish which have been netted, freeing snags, adjusting clothing, and the like. It is also frequently desired to have a means for carrying the fishing rod, in a manner leaving both hands free, while moving from one place to another.

Accordingly, it is a primary object of my invention to provide a holder device for a fishing rod which will enable the free use of both hands even while actually engaged in fishing.

It is also an object of my invention to provide a fishing rod holder which can be used to carry the fishing rod from place to place, both when assembled and when broken down into sections, without requiring the use of either hand.

Another object of my invention is to provide a practical and inexpensive fishing rod holder as aforesaid which is extremely simple in construction and light in weight, and which is readily secured to and detached from the user without requiring the use of a multitude of straps, harnesses or the like.

A fishing rod holder according to my invention is characterized by a seat or saddle member secured against one side of an elongated leg or body part adjacent one end thereof and adapted to rest against the user's hip a few inches below the waist line, the body part extending downwardly along the thigh and having adjacent its other end and against the other side thereof a socket member adapted to receive and retain the fishing rod handle.

The foregoing and other objects of my invention will become clearly apparent upon a perusal of the ensuing detailed description, taken together with the accompanying drawing wherein like reference numerals denote like parts throughout the various views and wherein:

Fig. 1 is a view in side elevation illustrating the manner of use of a preferred embodiment of my invention;

Fig. 2 is a front plan view of the holder device of Fig. 1;

Fig. 3 is a top plan view thereof;

Fig. 4 is a longitudinal sectional view thereof taken about on line IV—IV of Fig. 2; and Fig. 5 is a view corresponding to Fig. 1 but showing how my holder device accommodates the various sections of a fishing rod when broken down.

Referring now to the accompanying drawing illustrating a preferred embodiment of my invention, there is shown a saddle member 1 secured to the upper end portion of an elongated leg or body part 2, a socket member 3 being secured to the lower end portion of the body part on the opposite side thereof from the saddle member. A fastening device generally designated 4 is provided for a purpose to be described.

Saddle member 1 comprises a block formed either as a unitary member or in sections secured together as by a suitable adhesive so as to form a solid member, and is notched along its outer side edge, as at 1', to receive therein the body part 2, whereby member 1 extends outwardly at about a right angle to body part 2. Block 1 flares outwardly to an enlarged saddle portion 5 which has a concave curvature generally conforming to the body portion against which it is adapted to rest, and the curved surface 5 tapers inwardly toward body part 2 from top to bottom of member 1, as shown at 5', this taper being most pronounced adjacent the middle of the saddle portion and assisting in causing the lower end of body part 2 to bear against the angler's thigh. Saddle member 5 is provided on its curved and tapered surface 5, 5' with a number of loop members 6 adapted to receive a belt 6' therethrough, the belt preferably although not necessarily being separate from the belt used to hold up the trousers. Belt 6' is inserted through the loops 6 and fitted around the wearer's waist so that the saddle member 1 rests on the hip a few inches below the waistline, as illustrated in Fig. 1.

The body part 2 extends downwardly along the thigh with its lower end bearing against the thigh, and to avoid sharp edges which might damage the user's clothing the lower end corners of body part 2 are cut off, as indicated at 7.

Socket member 3 is secured on the lower end portion of body part 2, and on the side thereof opposite from the saddle member 1, the socket member being adapted to receive the handle of the fishing rod. Thus, socket member 3 is of elongated form having therein a relatively large diameter open ended socket 8 extending in the direction of body part 2 and adapted to receive the handle 20 of the fishing rod 21. A relatively small diameter socket 9 is formed in member 3 on one side of socket 8, and a slightly larger diameter socket 10 is positioned on the opposite side of socket 8 from socket 9, the sockets 9 and 10 having axes substantially parallel to the axis of socket 8. Socket 9 is adapted to receive, for example, the tip section 22 of a standard fly rod, and socket 10 is of a size to receive the middle section 23 of a standard fly rod or the tip section of a standard spinning rod, not illustrated.

When carrying a fly rod, the handle 20 thereof is inserted in socket 8 with the reel 24 facing away from the holder body part 2 and accommodated in a relatively large cut out portion 11 in socket member 3. A smaller cut out portion 12 is provided in the wall of socket member 3 at about a right angle to cut out portion 11, cut out portion 12 being adapted to receive the forefinger grip of a casting rod handle, or the neck of the reel of a spinning rod.

Thus, when actually fishing with, for example, a fly rod as illustrated the handle 20 will fit in socket 8 with the reel 24 being accommodated in cut out portion 11, and my holder device will completely support the rod enabling free use of both hands, thereby adding greatly to the convenience and comfort of the fisherman. Also, because saddle member 1 holds the upper end portion of body part 2 laterally outwardly from the user's body, the body part 2, and consequently the fishing rod, inclines upwardly and laterally outwardly away from the fisherman, thereby providing added clearance for free arm movement. Also, it will be appreciated that my holder device can be used by a boating angler as well as by a stream fisherman, and in a sitting position as well as in a standing position.

Thus, my holder device completely supports a fishing rod, even while actually fishing, and because the rod is held in an upright position the fisherman is enabled to readily move about even when the rod is completely assembled. Alternatively, the rod can be broken down into sections for still greater convenience in moving about from place to place, as illustrated in Fig. 5. In each instance, the rod is completely supported and both hands are left free.

The fastening means 4 comprises an elastic cord 13 having closed eye lugs 14, 14 at each end thereof, with one lug 14 being secured to one side of saddle member 1, as by means of a screw 15, in a manner enabling swiveling of that lug and attached cord 13. The cord 13 is therefore adapted to be swung around over and across the body part 2 to the opposite side of saddle member 1 with the other lug 14 detachably engaging a hook 16 or other suitable fastening. This cord, which normally hangs downwardly out of the way, is used when the rod has been broken down into sections fitted into the holder, the cord stretching across the sections to hold them in place against accidental loss and the like, and to hold them in a manner serving to avoid clatter. Obviously, the cord can be turned around each of the rod sections as desired to take up slack and to secure a proper anchorage.

Accordingly, it will be seen that a fishing rod holder device in accord with my invention is extremely simple in construction, inexpensive to manufacture, light in weight, convenient to use, and in all respects highly partical and satisfactory. It can be made of wood, or any other material suitable for the purpose, and it fully accomplishes the aforesaid objects, serving to hold the rod in a manner leaving both hands free, whether the rod is disassembled or assembled, both when actually fishing and when moving about from place to place. In addition, a holder device in accord with my invention is adapted to accommodate virtually any standard fishing rod.

While I have disclosed but a single preferred embodiment of my invention, my invention is not necessarily limited to the details thereof as the same is susceptible of various modifications and variations within the purview of one skilled in the art. Accordingly, I intend that the scope of my invention be defined by the appended claims.

Having completely disclosed and fully described my invention, together with its mode of operation, what I claim as new is:

1. A fishing rod holder adapted to be worn by the user thereof comprising, an elongated body part adapted to extend from adjacent the hip downwardly along the thigh of the user, a saddle member carried by said body part adjacent the upper end thereof and projecting laterally outwardly therefrom to bear against the user's hip, means for securing the holder to the body of the user with said saddle member bearing against the hip and spacing said upper body part end outwardly therefrom and with said body part extending downwardly therefrom, and a socket member carried by said body part adjacent the lower end thereof and on the side thereof opposite from said saddle member, said socket member having means defining a relatively large diameter socket therein adapted to receive the handle of a fishing rod and at least one relatively smaller diameter socket adapted to receive different sections of a fishing rod, all of said sockets extending in the general direction of said body part whereby the fishing rod and the sections thereof will be held in an upright position, means defining a relatively deep first cut out portion in the wall of said relatively large diameter socket for accommodating the reel of a fishing rod, and means providing a relatively shallow second cut out portion in the wall of said relatively large diameter socket in a position offset from said first cut out portion for accommodating the forefinger grip of a fishing rod handle.

2. A fishing rod holder adapted to be worn by the user thereof comprising, an elongated body part, a saddle member carried by said body part adjacent one end thereof and projecting laterally outwardly therefrom for bearing against the body of the user and spacing said one body part end outwardly therefrom, means for securing the holder to the body of the user thereof with said body part extending downwardly, a socket member carried by said body part adjacent the other end thereof and on the side thereof opposite from said saddle member, said socket member having a relatively large diameter first socket therein for accommodating the handle of a fishing rod, the wall of said first socket being cut out to accommodate the reel of a fishing rod, said socket member also having at least one relatively small diameter second socket therein for receiving different sections of a fishing rod, all of said sockets extending in the general direction of said body part, fastening means comprising elastic cord means secured to one side of said saddle member for extending across said body part and across and selectively around the fishing rod and fishing rod sections carried by said socket member, and means for detachably securing said cord means to the other side of said saddle member.

3. A fishing rod holder adapted to be worn by the user thereof comprising, an elongated body part adapted to extend downwardly from adjacent the hip to the thigh of the user, a saddle member carried by said body part adjacent the upper end thereof projecting outwardly from one side thereof and flaring outwardly beyond the opposite edges thereof to a bearing face portion, said bearing face portion being of concave curvature crosswise thereof and having its intermediate portion tapered inwardly toward said body part from top to bottom of said saddle member, loop means carried on said bearing face portion for receiving a belt therethrough for attachment to the body of the user with said saddle member resting against the hip adjacent the waistline and with said body part extending downwardly along the thigh, a socket member carried by said body part adjacent the lower end thereof and on the side thereof opposite from said saddle member, said socket member having a relatively large diameter first socket therein for accommodating the handle of a fishing rod and a number of relatively small diameter second sockets for accommodating different sections of a fishing rod, all of said sockets extending in the general direction of said body part for holding the fishing rod and the fishing rod sections in a generally upright position, the wall of said first socket being cut out to accommodate the reel of the fishing rod, fastening means comprising elastic cord means secured to one side of said saddle member for being brought across said body part and across and selectively around the fishing rod and the fishing rod sections, and means for detachably engaging said cord means to the other side of said saddle member.

References Cited in the file of this patent
UNITED STATES PATENTS

| 755,009 | Igel | Mar. 22, 1904 |
| 2,514,266 | Walslager | July 4, 1950 |
| 2,576,624 | Miller | Nov. 27, 1951 |
| 2,687,834 | Mathis | Aug. 31, 1954 |

FOREIGN PATENTS

| 38,548 | Norway | Dec. 10, 1923 |